US012711051B2

(12) United States Patent
Fields et al.

(10) Patent No.: US 12,711,051 B2
(45) Date of Patent: Aug. 18, 2026

(54) ERROR CHECKING FOR CODE

(71) Applicant: STATE FARM MUTUAL AUTOMOBILE INSURANCE COMPANY, Bloomington, IL (US)

(72) Inventors: Brian Mark Fields, Phoenix, AZ (US); Nathan L. Tofte, Downs, IL (US); Joseph Robert Brannan, Bloomington, IL (US); Vicki King, Bloomington, IL (US); Justin Davis, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 96 days.

(21) Appl. No.: 18/462,071

(22) Filed: Sep. 6, 2023

(65) Prior Publication Data

US 2024/0311271 A1 Sep. 19, 2024

Related U.S. Application Data

(60) Provisional application No. 63/464,073, filed on May 4, 2023, provisional application No. 63/464,061, filed (Continued)

(51) Int. Cl.

| | |
|---|---|
| ***G06F 11/00*** | (2006.01) |
| ***G06F 8/65*** | (2018.01) |

(Continued)

(52) U.S. Cl.

CPC ............ *G06F 11/3698* (2025.01); *G06F 8/65* (2013.01); *G06F 11/3604* (2013.01);

(Continued)

(58) Field of Classification Search

CPC .... G06F 8/65; G06F 11/3604; G06F 11/3688; G06F 11/3698; H04L 51/02

See application file for complete search history.

(56) References Cited

U.S. PATENT DOCUMENTS

| | | | |
|---|---|---|---|
| 7,698,342 | B1 | 4/2010 | Evans et al. |
| 8,095,393 | B2 | 1/2012 | Seifert et al. |

(Continued)

FOREIGN PATENT DOCUMENTS

| | | | |
|---|---|---|---|
| CA | 3227939 | A1 | 2/2023 |
| CN | 112164391 | A | 1/2021 |

(Continued)

OTHER PUBLICATIONS

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

(Continued)

*Primary Examiner* — Joshua P Lottich

(74) *Attorney, Agent, or Firm* — MARSHALL, GERSTEIN & BORUN LLP; Randall G. Rueth

(57) ABSTRACT

Apparatuses, systems and methods are provided for checking code for errors. The apparatuses, systems and methods may send a target code and a prompt for code checking to a machine learning (ML) chatbot to cause the ML chatbot to check the target code for errors. The apparatuses, systems and methods may determine whether there is an error in the target code based at least partially on a response from the ML chatbot. The apparatuses, systems and methods may, responsive to determining that there is an error in the target code, determine, via an interaction with the ML chatbot, a solution to fix the error. The apparatuses, systems and methods may analyze the solution to determine a number of at least one of (i) a set of steps or (ii) a set of interactions (Continued)

required by the solution. The apparatuses, systems and methods may, responsive to determining that the number exceeds a predetermined threshold, fix the error by implementing the solution with respect to the target code.

15 Claims, 6 Drawing Sheets

Related U.S. Application Data on May 4, 2023, provisional application No. 63/489,843, filed on Mar. 13, 2023, provisional application No. 63/489,852, filed on Mar. 13, 2023.

(51) Int. Cl.
*G06F 11/3604* (2025.01)
*G06F 11/3668* (2025.01)
*G06F 11/3698* (2025.01)
*H04L 51/02* (2022.01)
*G06Q 40/08* (2012.01)

(52) U.S. Cl.
CPC .......... *G06F 11/3688* (2013.01); *H04L 51/02* (2013.01); *G06Q 40/08* (2013.01)

(56) References Cited

U.S. PATENT DOCUMENTS 8,346,563 B1* 1/2013 Hjelm ................. G10L 15/1822 704/251
9,830,748 B2 11/2017 Rosenbaum
9,990,782 B2 6/2018 Rosenbaum
10,043,217 B1 8/2018 Bolden et al.
10,055,793 B1 8/2018 Call et al.
10,181,159 B1 1/2019 Allen et al.
10,217,068 B1 2/2019 Davis et al.
10,229,394 B1 3/2019 Davis et al.
10,269,190 B2 4/2019 Rosenbaum
10,387,966 B1 8/2019 Shah et al.
10,467,824 B2 11/2019 Rosenbaum
10,482,554 B1 11/2019 Vukich et al.
10,497,250 B1 12/2019 Hayward et al.
10,535,104 B1 1/2020 Mitchell et al.
10,579,971 B1 3/2020 Davis et al.
10,635,751 B1 4/2020 Relangi et al.
10,679,296 B1 6/2020 Devereaux et al.
10,769,953 B1 9/2020 Salles et al.
11,038,821 B1 6/2021 Harding et al.
11,087,404 B1 8/2021 Devereaux et al.
11,127,081 B1 9/2021 Kullman et al.
11,227,452 B2 1/2022 Rosenbaum
11,238,506 B1 2/2022 Tomlinson et al.
11,250,515 B1 2/2022 Feiteira et al.
11,407,410 B2 8/2022 Rosenbaum
11,438,283 B1 9/2022 White et al.
11,518,391 B1 12/2022 Sanchez
11,524,707 B2 12/2022 Rosenbaum
11,544,807 B1 1/2023 Breitweiser et al.
11,594,083 B1 2/2023 Rosenbaum
11,669,907 B1 6/2023 Behrens et al.
11,693,726 B2 7/2023 Lozano et al.
11,720,903 B1 8/2023 Henryson et al.
11,757,807 B2 9/2023 Bhardwaj et al.
11,783,421 B2 10/2023 Huls
11,790,296 B1 10/2023 Henryson et al.
11,818,111 B1* 11/2023 Debolt ................... G06N 3/006
11,836,805 B1 12/2023 Culbertson et al.
11,837,004 B1 12/2023 Agrahari et al.
11,922,515 B1 3/2024 Lombard et al.
12,087,152 B1 9/2024 Buentello et al.
12,217,606 B1 2/2025 Cheng et al.
12,236,377 B2 2/2025 Sohum et al.
2001/0027403 A1 10/2001 Peterson et al.
2001/0037265 A1 11/2001 Kleinberg
2002/0002475 A1 1/2002 Freedman et al.
2002/0112011 A1 8/2002 Washington
2003/0028448 A1 2/2003 Joseph et al.
2006/0212566 A1 9/2006 Boujard et al.
2008/0056473 A1 3/2008 Kent et al.
2009/0125320 A1 5/2009 Bickett
2009/0240531 A1 9/2009 Hilborn
2009/0287509 A1 11/2009 Basak et al.
2010/0145734 A1 6/2010 Becerra et al.
2011/0119574 A1 5/2011 Rogers et al.
2011/0295623 A1 12/2011 Behringer et al.
2011/0313794 A1 12/2011 Feeney
2012/0101852 A1 4/2012 Albert
2012/0124485 A1 5/2012 Scherpa et al.
2012/0143634 A1 6/2012 Beyda et al.
2012/0303390 A1 11/2012 Brook et al.
2013/0204619 A1* 8/2013 Berman .................. G06F 3/167 704/235
2013/0218603 A1 8/2013 Hagelstein et al.
2013/0226624 A1 8/2013 Blessman et al.
2014/0094991 A1 4/2014 Bouillet et al.
2014/0100892 A1 4/2014 Collopy et al.
2014/0222469 A1 8/2014 Stahl et al.
2014/0358731 A1 12/2014 Itte et al.
2014/0379385 A1 12/2014 Duncan et al.
2015/0170288 A1 6/2015 Harton et al.
2015/0213556 A1 7/2015 Haller, Jr.
2015/0338235 A1 11/2015 Schmidt et al.
2015/0339759 A1 11/2015 Pope et al.
2016/0041069 A1 2/2016 Huang et al.
2016/0071217 A1 3/2016 Edwards et al.
2016/0086231 A1 3/2016 Darey
2016/0238397 A1 8/2016 Caira et al.
2016/0273181 A1 9/2016 Smith
2017/0004508 A1 1/2017 Mansfield et al.
2017/0060694 A1 3/2017 Makhov et al.
2017/0103346 A1 4/2017 Bodell et al.
2017/0132643 A1 5/2017 Sagade et al.
2017/0132666 A1 5/2017 Slavin
2017/0191848 A1 7/2017 Jones
2018/0047288 A1 2/2018 Cordell et al.
2018/0075538 A1 3/2018 Konrardy et al.
2018/0082683 A1 3/2018 Chen et al.
2018/0173999 A1 6/2018 Renard
2018/0293483 A1 10/2018 Abramson et al.
2018/0293660 A1 10/2018 Rakshe et al.
2018/0334176 A1 11/2018 Park
2019/0037077 A1 1/2019 Konig et al.
2019/0095822 A1 3/2019 Rugel et al.
2019/0114715 A1 4/2019 Hessinger et al.
2019/0122121 A1 4/2019 Yu
2019/0306327 A1* 10/2019 Matysiak ................ G06F 3/167
2019/0332661 A1 10/2019 Halprin et al.
2019/0391827 A1 12/2019 Simanovich et al.
2020/0019893 A1 1/2020 Lu
2020/0042649 A1 2/2020 Bakis et al.
2020/0104876 A1 4/2020 Chintakindi et al.
2020/0143481 A1 5/2020 Brown et al.
2020/0154170 A1 5/2020 Wu et al.
2020/0167134 A1* 5/2020 Dey .......................... G06F 8/65
2020/0210490 A1 7/2020 Hutchins
2020/0274962 A1 8/2020 Martin et al.
2020/0285225 A1* 9/2020 Lankehanumaiah ........................ G05B 23/0205
2020/0339160 A1 10/2020 Rosenbaum
2021/0064932 A1 3/2021 Wang et al.
2021/0073330 A1 3/2021 Inagaki et al.
2021/0117923 A1 4/2021 Gray et al.
2021/0152496 A1 5/2021 Kim et al.
2021/0200950 A1* 7/2021 Basu ...................... G16H 10/60
2021/0203784 A1 7/2021 Konig et al.
2021/0256616 A1 8/2021 Hayward et al.
2021/0271820 A1 9/2021 Raghupatruni et al.
2021/0273892 A1 9/2021 Rakshit
2021/0295203 A1 9/2021 Liao et al.
2021/0350357 A1 11/2021 Lafontaine
2021/0357771 A1 11/2021 Flowers et al.
2021/0357790 A1 11/2021 Volkov et al.

(56) References Cited

U.S. PATENT DOCUMENTS

2021/0365955 A1 11/2021 Galante et al.
2021/0366048 A1 11/2021 Westhues et al.
2021/0374092 A1* 12/2021 Sahay ...................... G06N 5/01
2021/0383494 A1 12/2021 Leise et al.
2021/0390950 A1 12/2021 Kumar et al.
2021/0406938 A1 12/2021 Thakral
2022/0004630 A1 1/2022 Almukaynizi et al.
2022/0019496 A1* 1/2022 Lozano ............... G06F 11/0778
2022/0091957 A1* 3/2022 Szczepanik ......... G06F 11/0778
2022/0092893 A1 3/2022 Rosenbaum
2022/0094789 A1* 3/2022 Lau ......................... G10L 15/26
2022/0114594 A1 4/2022 Nunes et al.
2022/0136847 A1 5/2022 Higuchi et al.
2022/0176971 A1 6/2022 Nordh
2022/0198531 A1 6/2022 Cleaver et al.
2022/0261535 A1 8/2022 Madaan et al.
2022/0269583 A1 8/2022 Plawecki
2022/0279014 A1 9/2022 Stokes et al.
2022/0293107 A1 9/2022 Leaman et al.
2022/0300993 A1 9/2022 Chaudhry et al.
2022/0308943 A1* 9/2022 Srinivasan .............. G06F 40/40
2022/0340148 A1 10/2022 Rosenbaum
2022/0366459 A1 11/2022 Vieyra
2023/0005070 A1 1/2023 Nguyen et al.
2023/0017739 A1 1/2023 Feldman et al.
2023/0023869 A1* 1/2023 Ganesan ............. G06F 16/3329
2023/0060300 A1 3/2023 Rosenbaum
2023/0064816 A1 3/2023 Matsuoka et al.
2023/0105564 A1 4/2023 Breitweiser et al.
2023/0108454 A1 4/2023 Gidwaney et al.
2023/0110941 A1 4/2023 Makhija et al.
2023/0116639 A1 4/2023 Patt et al.
2023/0140931 A1 5/2023 Anderson et al.
2023/0141853 A1 5/2023 Vu et al.
2023/0244938 A1* 8/2023 Wei ........................ G06N 3/045 706/25
2023/0259821 A1 8/2023 Travalini et al.
2023/0267512 A1 8/2023 Isackson et al.
2023/0267694 A1 8/2023 Breitweiser et al.
2023/0290502 A1 9/2023 Zhi et al.
2023/0298567 A1 9/2023 Tan et al.
2023/0316412 A1 10/2023 Behrens et al.
2023/0343149 A1 10/2023 Volos et al.
2023/0385939 A1 11/2023 Tsuchiyma et al.
2023/0410801 A1 12/2023 Mishra
2024/0073219 A1 2/2024 Maizels et al.
2024/0102814 A1 3/2024 Karri et al.
2024/0119424 A1 4/2024 Lofvers et al.
2024/0167864 A1 5/2024 Donovan et al.
2024/0168611 A1 5/2024 Pham et al.
2024/0248920 A1 7/2024 Qiao et al.
2024/0249557 A1* 7/2024 Chavali ................... G10L 15/22
2024/0256780 A1 8/2024 Douglas et al.
2024/0371367 A1 11/2024 Churgin et al.
2024/0371376 A1 11/2024 Bohl et al.
2025/0013555 A1* 1/2025 Papadopoulos ..... G06F 11/3688

FOREIGN PATENT DOCUMENTS

EP 2946168 A1 11/2015
EP 3239686 A1 11/2017
EP 3578433 B1 8/2020
EP 3730375 B1 10/2021
EP 3960576 A1 3/2022
EP 4190659 A1 6/2023
EP 4190660 A1 6/2023
IN 201741025968 12/2017
KR 10-2148616 B1 8/2020
WO 2013/059620 A2 4/2013
WO 2014/111537 A1 7/2014
WO 2023/021162 A2 2/2023

OTHER PUBLICATIONS

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-agent-m-generative-ai-llm>. Retrieved from Internet on Aug. 1, 2023.
The Future of Car Insurance #2: How AI Is Transforming Auto Insurance for Companies and Drivers, Brogan Woodburn, Rashawn Mitchner, dated Jun. 22, 2023. (Year: 2023).
Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).
Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).
Isenberg, The Compliance Tasks ChatGPT Can (and Can't) Handle, Ignites (published Apr. 3, 2023).
Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).
Morris, Morgan Stanley Developing Chatbot with OpenAI, Ignites (published Mar. 15, 2023).
Munk, Will AI models like ChatGPT take your insurance job?, Life Annuity Speciality (published Mar. 7, 2023).
Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).
Smith, Insurer Zurich experiments with ChatGPT for claims and data mining, Financial Times (published Mar. 24, 2023).
Tuohy, What ChatGPT's Chores May Look Like in Life Insurance Industry, Life Annuity Specialist (published Apr. 21, 2023).
Wilson, Should Financial Services Companies Consider Open AI?, LIMRA.com MarketFacts (published Mar. 2023).
STIC EIC Search Report for U.S. Appl. No. 18/196,691 (Year: 2024).
Wang et al., Transfer learning-based query classification for intelligent building information spoken dialogue. Automation in Construction. Sep. 1, 2022; 141:104403. (Year: 2022).
"Encrypt Team," "ChatGPT—AI Chat bot—A Complete Guide," www.theencrypt.com 2022 (Year: 2022).
Hossen et al., Controlling home appliances adopting chatbot using machine learning approach. In International Conference on Intelligent Computing & Optimization, pp. 253-264, Springer International Publishing (Oct. 2022).
Jadhav et al., "Design and Development of Chatbot Based on Reinforcement Learning," Chapter 12, https://doi.org/10.1002/9781119861850.ch12 2022 (Year: 2022).
Mleczko, K. (2021). Chatbot as a tool for knowledge sharing in the maintenance and repair processes. Multidisciplinary Aspects of Production Engineering, 4(1), 499-508. (Year: 2021).
U.S. Appl. No. 18/462,032 ip.com NPL Search History, Report Run Date: Jun. 14, 2025.
Sankaranarayanan et al., Flood prediction based on weather parameters using deep learning, Journal of Water and Climate Change, 2020 (Year: 2020).
Zhang et al., DIALOGPT : Large-Scale Generative Pre-training for Conversational Response Generation, A collaboration between Microsoft Research and Microsoft Dynamics 365 AI Research, pp. 270-278, Jul. 5- Jul. 10, 2020.

* cited by examiner 200
202
212
210
215
204
222
215
224A
224B
224C
224D
RANKING
226
228
220
Reward
225
206
232
215
236
238
Cost 240
250
235
234
220
Reward 225
+
Final Reward 242

ERROR CHECKING FOR CODE

CROSS-REFERENCE TO RELATED APPLICATIONS

This application claims priority to and the benefit of the filing date of (1) provisional U.S. Patent Application No. 63/489,852 entitled "ERROR CHECKING FOR CODE OF INSURANCE APPLICATIONS," filed on Mar. 13, 2023, (2) provisional U.S. Patent Application No. 63/464,073 entitled "ERROR CHECKING FOR CODE OF INSURANCE APPLICATIONS," filed on May 4, 2023, (3) provisional U.S. Patent Application No. 63/489,843 entitled "GENERATION OF CUSTOMIZED CODE FOR INSURANCE APPLICATIONS," filed on Mar. 13, 2023, and (4) provisional U.S. Patent Application No. 63/464,061 entitled "GENERATION OF CUSTOMIZED CODE FOR INSURANCE APPLICATIONS," filed on May 4, 2023. The entire disclosure of each of the above-identified applications is hereby expressly incorporated herein by reference.

FIELD OF THE INVENTION

The present disclosure generally relates to error checking for code, and more particularly, error checking for code, such as code of insurance applications, via a machine learning chatbot or an artificial intelligence chatbot.

BACKGROUND

Code errors may be mistakes or defects in a computer program that prevent it from functioning correctly or produce incorrect results. Code errors may be classified into two types: syntax errors and logic errors. Syntax errors may be violations of the rules of the programming language, such as missing a semicolon or using an undefined variable. Logic errors may be flaws in the design or algorithm of the program, such as using the wrong formula or condition. Code errors may cause various problems, such as crashes, security breaches, data loss, or poor performance. Therefore, it is important to detect and correct code errors before deploying or running a program.

Various methods and tools have been developed for checking code for errors, such as compilers, debuggers, code analyzers, code reviewers, and testing frameworks. However, these methods and tools may usually require significant manual intervention and human expertise.

The conventional error checking techniques may include additional ineffectiveness, inefficiencies, encumbrances, and/or other drawbacks. Accordingly, there may be a need for a tool for automatically detecting code errors and fixing the errors.

SUMMARY

The present embodiments may relate to, inter alia, systems and methods for error checking for code via a machine learning and/or artificial intelligence chatbot (or voice bot).

In one aspect, a computer system for error checking for code using a machine learning (ML) chatbot (or voice bot) or an artificial intelligence (AI) chatbot (or voice bot). The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, InstructGPT bots, Codex bots, Google Bard bots, and/or other electronic or electrical components, which may be in wired or wireless communication with one another. For example, in one instance, the computer system may comprise one or more processors; and a non-transitory memory storing executable instructions thereon that, when executed by the one or more processors, cause the one or more processors to: (1) send the target code and a prompt for code checking to a machine learning (ML) chatbot to cause the ML chatbot to check the target code for errors, (2) determine whether there is an error in the target code based upon a response from the ML chatbot, (3) responsive to determining that there is an error in the target code, determine, via an interaction with the ML chatbot, a solution to fix the error, (4) analyze the solution to determine a number of at least one of (i) a set of steps or (ii) a set of interactions required by the solution, and/or (5) responsive to determining that the number exceeds a predetermined threshold, fix the error by implementing the solution with respect to the target code. The computer system may include additional, fewer, or alternative functionalities, including that discussed elsewhere herein.

In another aspect, a computer-implemented method for error checking for code using a machine learning (ML) chatbot (or voice bot) or an artificial intelligence (AI) chatbot (or voice bot). The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, InstructGPT bots, Codex bots, Google Bard bots, and/or other electronic or electrical components, which may be in wired or wireless communication with one another. For example, in one instance, the computer-implemented method may comprise: (1) sending, by one or more processors, the target code and a prompt for code checking to a machine learning (ML) chatbot to cause the ML chatbot to check the target code for errors, (2) determining, by the one or more processors, whether there is an error in the target code based upon a response from the ML chatbot, (3) responsive to determining that there is an error in the target code, determining, by the one or more processors, via an interaction with the ML chatbot, a solution to fix the error, (4) analyzing, by the one or more processors, the solution to determine a number of at least one of (i) a set of steps or (ii) a set of interactions required by the solution, and/or (5) responsive to determining that the number exceeds a predetermined threshold, fixing, by the one or more processors, the error by implementing the solution with respect to the target code. The method may include additional, fewer, or alternative functionalities or actions, including those discussed elsewhere herein.

In another aspect, a non-transitory computer-readable medium storing processor-executable instructions that, when executed by one or more processors, cause the one or more processors to: (1) send the target code and a prompt for code checking to a machine learning (ML) chatbot to cause the ML chatbot to check the target code for errors, (2) determine whether there is an error in the target code based upon a response from the ML chatbot, (3) responsive to determining that there is an error in the target code, determine, via an interaction with the ML chatbot, a solution to fix the error, (4) analyze the solution to determine a number of at least one of (i) a set of steps or (ii) a set of interactions required by the solution, and/or (5) responsive to determining that the number exceeds a predetermined threshold, fix the error by implementing the solution with respect to the target code. The instructions may direct additional, fewer, or alternative functionalities, including that discussed elsewhere herein.

Additional, alternate and/or fewer actions, steps, features and/or functionalities may be included in an aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Exemplary Computing Environment

Figure 1:
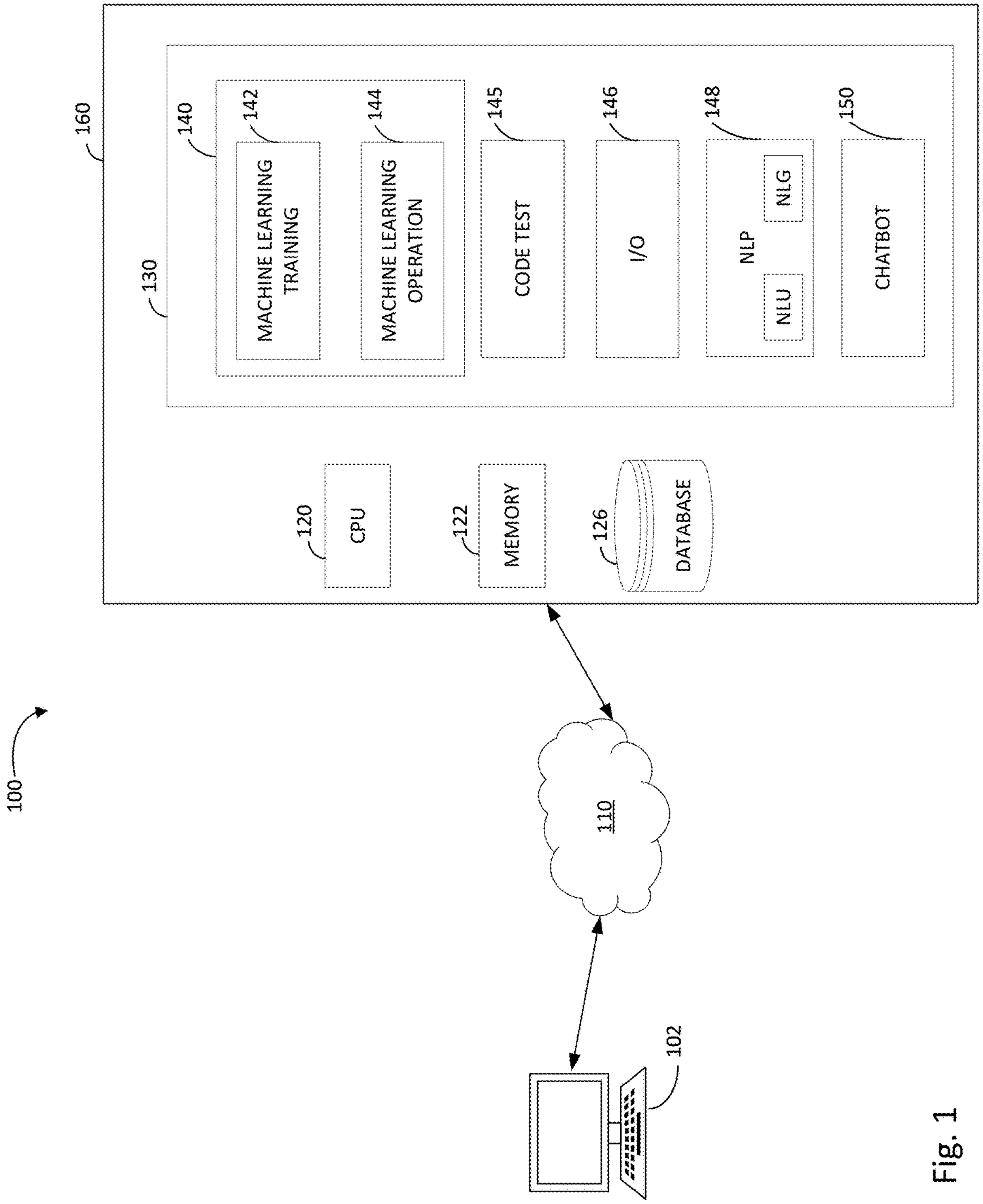
FIG. 1 depicts a block diagram of an exemplary computer system in which methods and systems for checking code for errors according to one embodiment.

FIG. 1 depicts a block diagram of an exemplary computing environment 100 in which checking code for errors may be performed, in accordance with various aspects discussed herein.

In the exemplary aspect of FIG. 1, the computing environment 100 includes a user device 102. In various aspects, the user device 102 comprises one or more computing devices, which may comprise multiple, redundant, or replicated client computing devices accessed by one or more users. The computing environment 100 may further include an electronic network 110 communicatively coupling other aspects of the computing environment 100.

The user device 102 may be any suitable device, including one or more computers, laptops, mobile devices, wearables, and/or other electronic or electrical component. The user device 102 may include a memory and a processor for, respectively, storing and executing one or more functionalities. The memory may include one or more suitable storage media such as a magnetic storage device, a solid-state drive, random access memory (RAM), etc. The user device 102 may access services or other components of the computing environment 100 via the network 110.

As described herein and in an aspect, one or more servers 160 may perform the functionalities as part of a cloud network or may otherwise communicate with other hardware or software components within one or more cloud computing environments to send, retrieve, or otherwise analyze data or information described herein. For example, in certain aspects of the present techniques, the computing environment 100 may comprise an on-premise computing environment, a multi-cloud computing environment, a public cloud computing environment, a private cloud computing environment, and/or a hybrid cloud computing environment. For example, an entity (e.g., a business) providing a chatbot to check code for errors may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by an enterprise that checks code for errors. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 3G, 4G, 5G, 6G, etc.). Generally, the network 110 enables bidirectional communication between the user device 102 and the servers 160. In one aspect, the network 110 may comprise a cellular base station, such as cell tower(s), communicating to the one or more components of the computing environment 100 via wired/wireless communications based upon any one or more of various mobile phone standards, including NMT, GSM, CDMA, UMMTS, LTE, 5G, 6G or the like. Additionally or alternatively, the network 110 may comprise one or more routers, wireless switches, or other such wireless connection points communicating to the components of the computing environment 100 via wireless communications based upon any one or more of various wireless standards, including by non-limiting example, IEEE 802.11a/b/c/g (WIFI), Bluetooth, and/or the like.

The one or more processors 120 may include one or more suitable processors (e.g., central processing units (CPUs) and/or graphics processing units (GPUs)). The one or more processors 120 may be connected to the memory 122 via a computer bus (not depicted) responsible for transmitting electronic data, data packets, or otherwise electronic signals to and from the one or more processors 120 and memory 122 in order to implement or perform the machine-readable instructions, methods, processes, elements or limitations, as illustrated, depicted, or described for the various flowcharts, illustrations, diagrams, figures, and/or other disclosure herein. The one or more processors 120 may interface with the memory 122 via a computer bus to execute an operating system (OS) and/or computing instructions contained therein, and/or to access other services/aspects. For example, the one or more processors 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer-based product, application, or code (e.g., the model(s), such as ML models, or other computing instructions described herein) may be stored on a computer usable storage medium, or tangible, computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data and be used to train and/or operate one or more ML models, chatbots, and/or voice bots.

In one aspect, the computing functionalities 130 may include an ML module 140. The ML module 140 may include ML training model (MLTM) 142 and/or ML operation model (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, support vector machines and generative pre-trained transformers. In various embodiments, the implemented ML methods and algorithms are directed toward at least one of a plurality of categorizations of ML, such as supervised learning, unsupervised learning, and reinforcement learning.

In one aspect, the ML based algorithms may be included as a library or package executed on server(s) 130. For example, libraries may include the TensorFlow based library, the PyTorch library, a HuggingFace library, and/or the scikit-learn Python library.

In one embodiment, the ML module 140 may employ supervised learning, which involves identifying patterns in existing data to make predictions about subsequently received data. Specifically, the ML functionality is "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprise a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with a de novo input that the model has not previously been provided, the model may output one or more predictions, classifications, etc., as described herein.

In one embodiment, the MLOM 144 may be trained to identify a code module from the code provided by a user. For example, a portion of code that does not invoke another portion of the code may be determined as a module. The input for training may be code, and/or documents associated with code, labeled with code modules comprised in the code.

The training process may use any supervised learning techniques, unsupervised learning techniques, and/or reinforcement techniques. The MLOM 144 may be further trained to disable lines in a portion of the code (e.g., a module defined by a developer) that invokes another portion from the code. The input for training may be code, and/or documents associated with code, labeled with code lines to be disabled.

In one embodiment, the MLOM 144 may be trained to generate images showing a process of fixing code errors. The input for training may be code, the steps for fixing the error (either in natural language or as executable instructions), images showing other processes of fixing code errors, and/or images showing the steps for fixing the error.

In one embodiment, the MLOM 144 may be trained to generate videos showing a process of fixing code errors. The input for training may be code, the steps for fixing the error (either in natural language or as executable instructions), videos showing other processes of fixing code errors, and/or videos showing the steps for fixing the error. The input for training may be pre-processed by a video analysis model (not depicted). For example, the video analysis model may separate the videos for training into several clips, each portion with a key frame. The video analysis model may determine a key frame by comparing frames along the timeline of the video. A frame having a significant difference from its preceding or subsequent frame may be determined as a key frame. Alternatively, a frame in the middle of two significant changes may be determined as a key frame. The video analysis model may compare the frames by comparing the pixels comprised in the frames. In this way, the training data may be more granulated as a video clip may be associate with one step and even less. Using a key frame as part of the training data may allow the ML functionality 140 to "focus" on key information comprised in a training video. After the pre-processing, the MLOM 144 may be trained with code, steps for fixing the error, video clips and key frames showing other processes of fixing code errors, and/or video clips and key frames showing the steps for fixing the error.

In one embodiment, the MLOF 144 may be trained to generate audio data based upon text (e.g., by using a text-to-speech (TTS) engine). The input for training may be text describing a process of fixing code errors with audio associated with such texts. The input for training may be pre-processed by the NLP model 148. For example, the NLP model 148 may separate the texts and audios into semantic clusters. The MLOM 144 may then be trained based upon the semantic clusters.

In one aspect, the computing modules 130 may include a code test module 145 comprising a set of computer-executable instructions implementing code provided by a user or received from other modules. The code test module 145 may communicate with the chatbot 150 and implement code received from the chatbot 150. The code test module 145 may communicate with the user device 102 via the networks 110 and implement code received from the user device 102. When the code test module 145 fails to implement code, the code test functionality may provide information of the error that caused the failure. The error information may comprise the line number where the error occurred, the type of the error, and/or an error code. Responsive to executable instructions for changing code, the code test module 145 may change the code accordingly. Responsive to an executable instruction of adding break points at particular lines, the code test module 145 may add break points at the particular lines and pause at the break points when implementing the code. The code test module 145 may provide an intermediate output comprising the values of the variables in the code when the implementation is paused.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local user devices, such as the computer network 110 and/or the user device 102 (for rendering or visualizing) described herein. In one aspect, the servers 160 may include a client-server platform technology such as ASP.NET, Java J2EE, Ruby on Rails, Node.js, a web service or online API, responsive for receiving and responding to electronic requests.

The I/O module 146 may further include or implement an operator interface configured to present information to an administrator or operator and/or receive inputs from the administrator and/or operator. An operator interface may provide a display screen. The I/O functionality 146 may facilitate I/O components (e.g., ports, capacitive or resistive touch sensitive input panels, keys, buttons, lights, LEDs), which may be directly accessible via, or attached to, servers 160 or may be indirectly accessible via or attached to the user device 102. According to an aspect, an administrator or operator may access the servers 160 via the user device 102 to review information, make changes, input training data, initiate training via the MLTM 142, and/or perform other functions (e.g., operation of one or more trained models via the MLOM 144).

In one aspect, the computing module 130 may include one or more NLP models 148 comprising a set of computer-executable instructions implementing NLP, natural language understanding (NLU) and/or natural language generator (NLG) models. The NLP model 148 may be responsible for transforming the user input (e.g., unstructured conversational input such as speech or text) to an interpretable format. The NLP model 148 may include NLU processing to understand the intended meaning of utterances, among other things. The NLP model 148 may include NLG which may provide text summarization, machine translation, and/or dialog where structured data is transformed into natural conversational language (i.e., unstructured) for output to the user.

In one aspect, the computing modules 130 may include one or more chatbots and/or voice bots 150 which may be programmed to simulate human conversation, interact with users, understand their needs, and recommend an appropriate line of action with minimal and/or no human intervention, among other things. This may include providing the best response of any query that it receives and/or asking follow-up questions.

In some embodiments, the voice bots or chatbots 150 discussed herein may be configured to utilize AI and/or ML techniques. For instance, the voice bot or chatbot 150 may be a ChatGPT bot, an InstructGPT bot, a Codex bot, or a Google Bard bot. The voice bot or chatbot 150 may employ supervised or unsupervised ML techniques, which may be followed by, and/or used in conjunction with, reinforced or reinforcement learning techniques. The voice bot or chatbot 150 may employ the techniques utilized for ChatGPT, ChatGPT bot, InstructGPT bot, Codex bot, or Google Bard bot.

Noted above, in some embodiments, a chatbot 150 or other computing device may be configured to implement ML, such that server 160 "learns" to analyze, organize, and/or process data without being explicitly programmed.

ML may be implemented through ML methods and algorithms. In one exemplary embodiment, the ML module 140 may be configured to implement ML methods and algorithms.

In one aspect, the server 160 may receive code from a user via the user device 102, and send, via one or more processors 120, at least a portion of the code (hereinafter, the "target code") to a chatbot 150 for error checking. For example, the code received from a user may be code implementing an insurance application. The server 160 send the entire code (i.e., the target code in subsequent steps) of an insurance application to the chatbot 150 for error checking. Alternatively, the one or more processors 120 may send component portions of the code of an insurance application (i.e., the target code in subsequent steps) to the chatbot 150 at one time. In this example, the server 160 may identify one or more code modules of the target code and send the modules one by one. More details regarding identifying code modules by the server 160 are described below. In other embodiments, the server 160 may provide the chatbot 150 a location (e.g., a file path, a directory location, an FTP address, and/or other types of locations associated with hosting code) of the target code for the chatbot 150.

In one aspect, the server 160 may determine, via the one or more processors 120, whether there is an error in the target code based upon the response from the chatbot 150. The server 160 may make the determination via the NLP model 148 by analyzing the response from the chatbot 150. Alternatively, the server 160 may analyze the response from the chatbot 150 by pattern matching. More details regarding the analysis of responses from the chatbot 150 by the server 160 are described below.

In one aspect, responsive to determining there is an error, the server 160 may determine, via one or more processors 120, whether there is a solution to the error via an interaction with the chatbot 150. The server 160 may analyze the response from the chatbot 150 via the NLP model 148 to make the determination. Alternatively, the server 160 may analyze the response from the chatbot 150 using pattern matching techniques.

In one aspect, responsive to determining there is a solution, the server 160 may cause, via the one or more processors 120, the chatbot to fix the error. Alternatively, the server 160 may, via the one or more processors 120, fix the error by implementing the solution with respect to the target code. Further, the server 160 may, via the one or more processors 120, show the process to fix the error to a user to inform the user of the process. More details regarding fixing code errors by the server 160 are described below.

While various embodiments, examples, and/or aspects disclosed herein may include training and generating one or more ML models and/or chatbot 150 for the server 160 to load at runtime, it is also contemplated that one or more appropriately trained ML models and/or chatbot 150 may already exist (e.g., in database 126) such that the server 160 may load an existing trained ML model and/or chatbot 150 at runtime. It is further contemplated that the server 160 may retrain, update and/or otherwise alter an existing ML model and/or chatbot 150 before loading the model at runtime.

Although the computing environment 100 is shown to include one user device 102, one server 160, and one network 110, it should be understood that different numbers of user devices 102, networks 110, and/or servers 160 may be utilized. In one example, the computing environment 100 may include a plurality of servers 160 and hundreds or thousands of user devices 102, all of which may be interconnected via the network 110. Furthermore, the database storage or processing performed by the one or more servers 160 may be distributed among a plurality of servers 160 in an arrangement known as "cloud computing." This configuration may provide various advantages, such as enabling near real-time uploads and downloads of information as well as periodic uploads and downloads of information.

The computing environment 100 may include additional, fewer, and/or alternative functionalities, and may be configured to perform additional, fewer, or alternate actions, including functionalities/actions described herein. Although the computing environment 100 is shown in FIG. 1 as including one instance of various components such as user device 102, server 160, and network 110, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 160 and user device 102 may be connected via a direct communication link (not shown in FIG. 1) instead of, or in addition to, via network 110.

Exemplary Training of the ML Chatbot Model

An enterprise may be able to use programmable chatbots, such as the chatbot 150 and/or an ML chatbot (e.g., ChatGPT), to provide tailored, conversational-like customer service relevant to a line of business. The chatbot may be capable of understanding customer requests, providing relevant information, escalating issues, any of which may assist and/or replace the need for customer service assets of an enterprise. Additionally, the chatbot may generate data from customer interactions which the enterprise may use to personalize future support and/or improve the chatbot's functionality, e.g., when retraining and/or fine-tuning the chatbot.

The ML chatbot may provide advance features as compared to a non-ML chatbot, which may include and/or derive functionality from a large language model (LLM). The ML chatbot may be trained on a server, such as server 160, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input. In one aspect, the prompt may be provided to, and/or the response received from, the ML chatbot and/or any other ML model, via a user interface of the server. This may include a user interface device operably connected to the server via an I/O functionality, such as the I/O functionality 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user prompts and/or utterances, which may require the ML chatbot to keep track of an entire conversation history as well as the current state of the conversation. The ML chatbot may rely on various techniques to engage in conversations with users, which may include the use of short-term and long-term memory. Short-term memory may temporarily store information (e.g., in the memory 122 of the server 160) that may be required for immediate use and may keep track of the current state of the conversation and/or to understand the user's latest input in order to generate an appropriate response. Long-term memory may include persistent storage of information (e.g., on database 126 of the server 160) which may be accessed over an extended period of time. The long-term memory may be used by the ML chatbot to store information about the user (e.g., preferences, chat history, etc.) and may be useful for improving an overall user experience by enabling the ML chatbot to personalize and/or provide more informed responses.

The system and methods to generate and/or train an ML chatbot model (e.g., via the ML functionality 140 of the server 160) which may be used the an ML chatbot, may consists of three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 2:
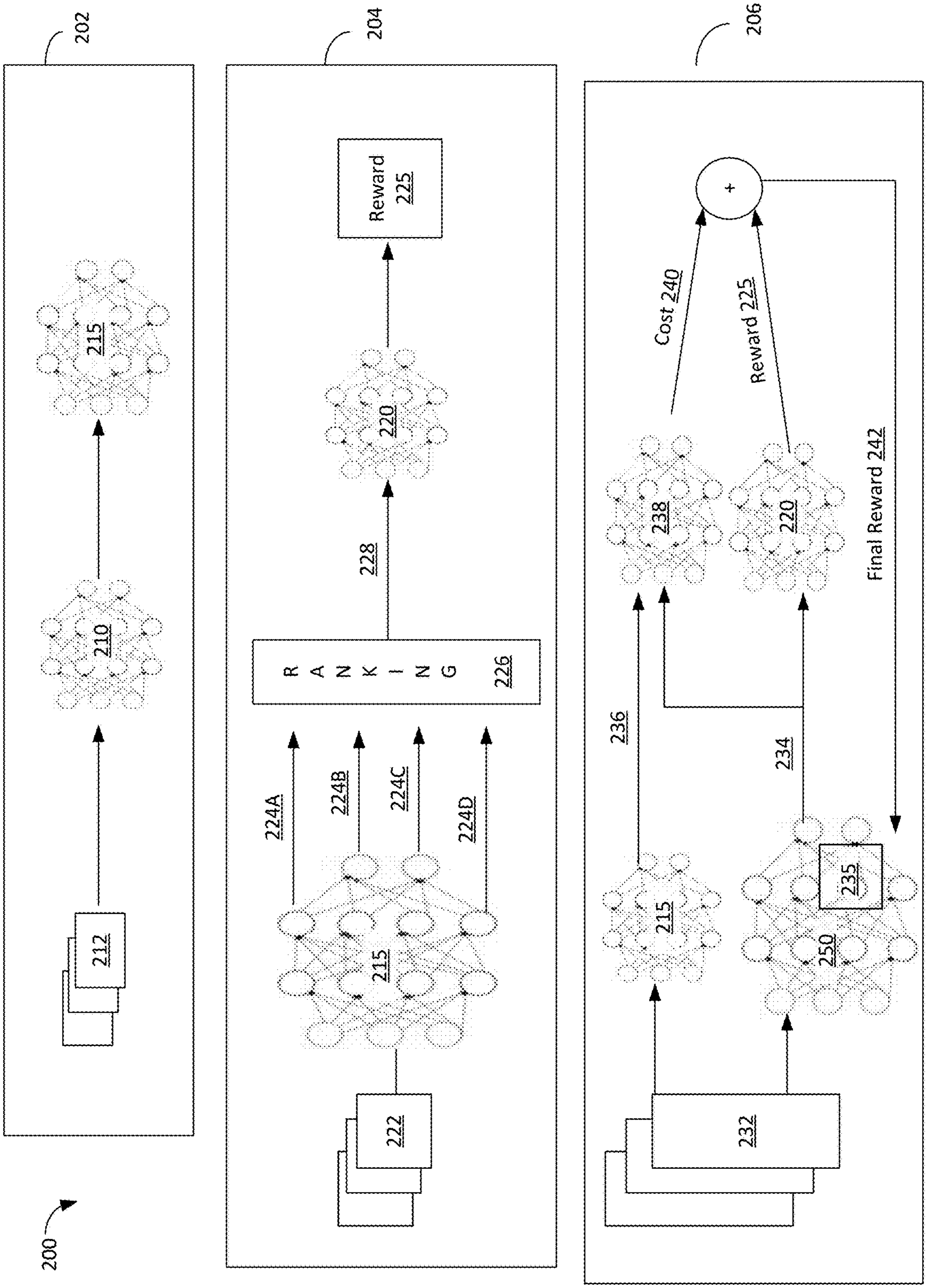
FIG. 2 depicts a combined block and logic diagram in which exemplary computer-implemented methods and systems for training an ML chatbot are implemented according to one embodiment.

FIG. 2 depicts a combined block and logic diagram 200 for training an ML chatbot model, in which the techniques described herein may be implemented, according to some embodiments. Some of the blocks in FIG. 2 may represent hardware and/or software components, other blocks may represent data structures or memory storing these data structures, registers, or state variables (e.g., 212), and other blocks may represent output data (e.g., 225). Input and/or output signals may be represented by arrows labeled with corresponding signal names and/or other identifiers. The methods and systems may include one or more servers 202, 204, 206, such as the server 160 of FIG. 1.

In one aspect, the server 202 may fine-tune a pretrained language model 210. The pretrained language model 210 may be obtained by the server 202 and be stored in a memory, such as memory 122 and/or database 126. The pretrained language model 210 may be loaded into an ML training functionality, such as MLTF 142, by the server 202 for retraining/fine-tuning. A supervised training dataset 212 may be used to fine-tune the pretrained language model 210 wherein each data input prompt to the pretrained language model 210 may have a known output response for the pretrained language model 210 to learn from. The supervised training dataset 212 may be stored in a memory of the server 202, e.g., the memory 122 or the database 126. In one aspect, the data labelers may create the supervised training dataset 212 prompts and appropriate responses. The pretrained language model 210 may be fine-tuned using the supervised training dataset 212 resulting in the SFT ML model 215 which may provide appropriate responses to user prompts once trained. The trained SFT ML model 215 may be stored in a memory of the server 202, e.g., memory 122 and/or database 126.

In one aspect, the supervised training dataset 212 may include prompts and responses which may be relevant to a user requesting checking code for errors. For example, the prompt may include the code to be checked. Appropriate responses may include that the code is incomplete and more information is needed regarding a particular part, the code does not have errors, the code has errors (including the type of the error, the lines where the error occurs, and/or a solution for fixing the error, among other things), and/or send the code to another functionality (e.g., the code test functionality 145) to implement the code and determine if there are errors.

As another example, the prompt may include test cases with which the code should be implemented for testing purposes. Appropriate responses may include that the code was not implemented successfully, the code was implemented successfully but the output is inconsistent with the intended results, and/or the code was implemented successfully and the output is consistent with the intended results. Alternatively, appropriated responses may include sending the code and test cases to another functionality (e.g., the code test functionality 145) to implement the code with the test cases and receive output from the functionality.

In one aspect, the supervised training dataset 212 may include prompts and responses which may be relevant to a user requesting solutions for code errors. For example, the prompt may include the code and the error to be solved. The prompt may also be a follow-up question about a solution after the chatbot has identified an error. To this end, the chatbot may be trained to combine previous prompt and/or response when generating appropriate responses. Appropriate responses may include informing the user that there is no solution to the error, confirming that there is a solution and providing the solution to the user, and/or suggesting that there may be a solution and providing a process to find the solution, among other things.

In one aspect, the supervised training dataset 212 may include prompts and responses which may be relevant to a user requesting fixing an error in code. For example, the prompt may include the code and the fix to be implemented. The prompt may also be a follow-up command for fixing an error after the chatbot has identified the error. To this end, the chatbot may be trained to combine previous prompt and/or response when generating appropriate responses. Appropriate responses may include providing corrected code, and/or providing the process of how the error was fixed.

In one aspect, the supervised training dataset 212 may include code compliant for use in an insurance application. For example, the code for training may be code that implements current or past insurance applications. The code for training may be general purpose code that may be used in an insurance application. The code for training may contain errors collected from human experts in the art, students in the art, and sources in the public domain. For example, the code may be collected from a website (e.g., Stack Overflow, GitHub, YouTube) where people usually ask questions about how to fix a code error. Appropriate responses associated with the code for training may be the responses collected from such websites. Additionally, the code for training may be written by human experts for training purposes. The human experts may put errors, either simple or complex errors, in the code on purpose, and provide solutions to the errors to train the chatbot to generate appropriate responses.

Training the Reward Model

In one aspect, training the ML chatbot model 250 may include the server 204 training a reward model 220 to provide as an output a scaler value/reward 225. The reward model 220 may be required to leverage reinforcement learning with human feedback (RLHF) in which a model (e.g., ML chatbot model 250) learns to produce outputs which maximize its reward 225, and in doing so may provide responses which are better aligned to user prompts.

Training the reward model 220 may include the server 204 providing a single prompt 222 to the SFT ML model 215 as an input. The input prompt 222 may be provided via an input device (e.g., a keyboard) via the I/O functionality of the server, such as I/O functionality 146. The prompt 222 may be previously unknown to the SFT ML model 215, e.g., the labelers may generate new prompt data, the prompt 222 may include testing data stored on database 126, and/or any other suitable prompt data. The SFT ML model 215 may generate multiple, different output responses 224A, 224B, 224C, 224D to the single prompt 222. The server 204 may output the responses 224A, 224B, 224C, 224D via an I/O functionality (e.g., I/O functionality 146) to a user interface device, such as a display (e.g., as text responses), a speaker (e.g., as audio/voice responses), and/or any other suitable manner of output of the responses 224A, 224B, 224C, 224D for review by the data labelers.

The data labelers may provide feedback via the server 204 on the responses 224A, 224B, 224C. 224D when ranking 226 them from best to worst based upon the prompt-response pairs. The data labelers may rank 226 the responses 224A, 224B, 224C, 224D by labeling the associated data. The ranked prompt-response pairs 228 may be used to train the reward model 220. In one aspect, the server 204 may load the reward model 220 via the ML functionality (e.g., the ML functionality 140) and train the reward model 220 using the ranked response pairs 228 as input. The reward model 220 may provide as an output the scalar reward 225.

In one aspect, the scalar reward 225 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 220 may generate a winning reward. Inputting a "losing" prompt-response pair data to the same reward model 220 may generate a losing reward. The reward model 220 and/or scalar reward 236 may be updated based upon labelers ranking 226 additional prompt-response pairs generated in response to additional prompts 222.

In one example, a data labeler may provide to the SFT ML model 215 as an input prompt 222, "Describe the sky." The input may be provided by the labeler via the user device 102 over network 110 to the server 204 running a chatbot application utilizing the SFT ML model 215. The SFT ML model 215 may provide as output responses to the labeler via the user device 102: (i) "the sky is above" 224A; (ii) "the sky includes the atmosphere and may be considered a place between the ground and outer space" 224B; and (iii) "the sky is heavenly" 224C. The data labeler may rank 226, via labeling the prompt-response pairs, prompt-response pair 222/224B as the most preferred answer; prompt-response pair 222/224A as a less preferred answer; and prompt-response 222/224C as the least preferred answer. The labeler may rank 226 the prompt-response pair data in any suitable manner. The ranked prompt-response pairs 228 may be provided to the reward model 220 to generate the scalar reward 225.

While the reward model 220 may provide the scalar reward 225 as an output, the reward model 220 may not generate a response (e.g., text). Rather, the scalar reward 225 may be used by a version of the SFT ML model 215 to generate more accurate responses to prompts, i.e., the SFT model 215 may generate the response such as text to the prompt, and the reward model 220 may receive the response to generate a scalar reward 225 of how well humans perceive it. Reinforcement learning may optimize the SFT model 215 with respect to the reward model 220 which may realize the configured ML chatbot model 250.

RLHF to Train the ML Chatbot Model

In one aspect, the server 206 may train the ML chatbot model 250 (e.g., via the ML module 140) to generate a response 234 to a random, new and/or previously unknown user prompt 232. To generate the response 234, the ML chatbot model 250 may use a policy 235 (e.g., algorithm) which it learns during training of the reward model 220, and in doing so may advance from the SFT model 215 to the ML chatbot model 250. The policy 235 may represent a strategy that the ML chatbot model 250 learns to maximize its reward 225. As discussed herein, based upon prompt-response pairs, a human labeler may continuously provide feedback to assist in determining how well the ML chatbot's 250 responses match expected responses to determine rewards 225. The rewards 225 may feed back into the ML chatbot model 250 to evolve the policy 235. Thus, the policy 235 may adjust the parameters of the ML chatbot model 250 based upon the rewards 225 it receives for generating good responses. The policy 235 may update as the ML chatbot model 250 provides responses 234 to additional prompts 232.

In one aspect, the response 234 of the ML chatbot model 250 using the policy 235 based upon the reward 225 may be compared using a cost function 238 to the SFT ML model 215 (which may not use a policy) response 236 of the same prompt 232. The cost function 238 may be trained in a similar manner and/or contemporaneous with the reward model 220. The server 206 may compute a cost 240 based upon the cost function 238 of the responses 234, 236. The cost 240 may reduce the distance between the responses 234, 236, i.e., a statistical distance measuring how one probability distribution is different from a second, in one aspect the response 234 of the ML chatbot model 250 versus the response 236 of the SFT model 215. Using the cost 240 to reduce the distance between the responses 234, 236 may avoid a server over-optimizing the reward model 220 and deviating too drastically from the human-intended/preferred response. Without the cost 240, the ML chatbot model 250 optimizations may result in generating responses 234 which are unreasonable but may still result in the reward model 220 outputting a high reward 225.

In one aspect, the responses 234 of the ML chatbot model 250 using the current policy 235 may be passed by the server 206 to the rewards model 220, which may return the scalar reward 225. The ML chatbot model 250 response 234 may be compared via the cost function 238 to the SFT ML model 215 response 236 by the server 206 to compute the cost 240. The server 206 may generate a final reward 242 which may include the scalar reward 225 offset and/or restricted by the cost 240. The final reward 242 may be provided by the server 206 to the ML chatbot model 250 and may update the policy 235, which in turn may improve the functionality of the ML chatbot model 250.

To optimize the ML chatbot 250 over time, RLHF via the human labeler feedback may continue ranking 226 responses of the ML chatbot model 250 versus outputs of earlier/other versions of the SFT ML model 215, i.e., providing positive or negative rewards 225. The RLHF may allow the servers (e.g., servers 204, 206) to continue iteratively updating the reward model 220 and/or the policy 235. As a result, the ML chatbot model 250 may be retrained and/or fine-tuned based upon the human feedback via the RLHF process, and throughout continuing conversations may become increasingly efficient.

Although multiple servers 202, 204, 206 are depicted in the exemplary block and logic diagram 200, each providing one of the three steps of the overall ML chatbot model 250 training, fewer and/or additional servers may be utilized and/or may provide the one or more steps of the ML chatbot model 250 training. In one aspect, one server may provide the entire ML chatbot model 250 training.

Exemplary Graphical User Interface (GUI)

Figure 3:
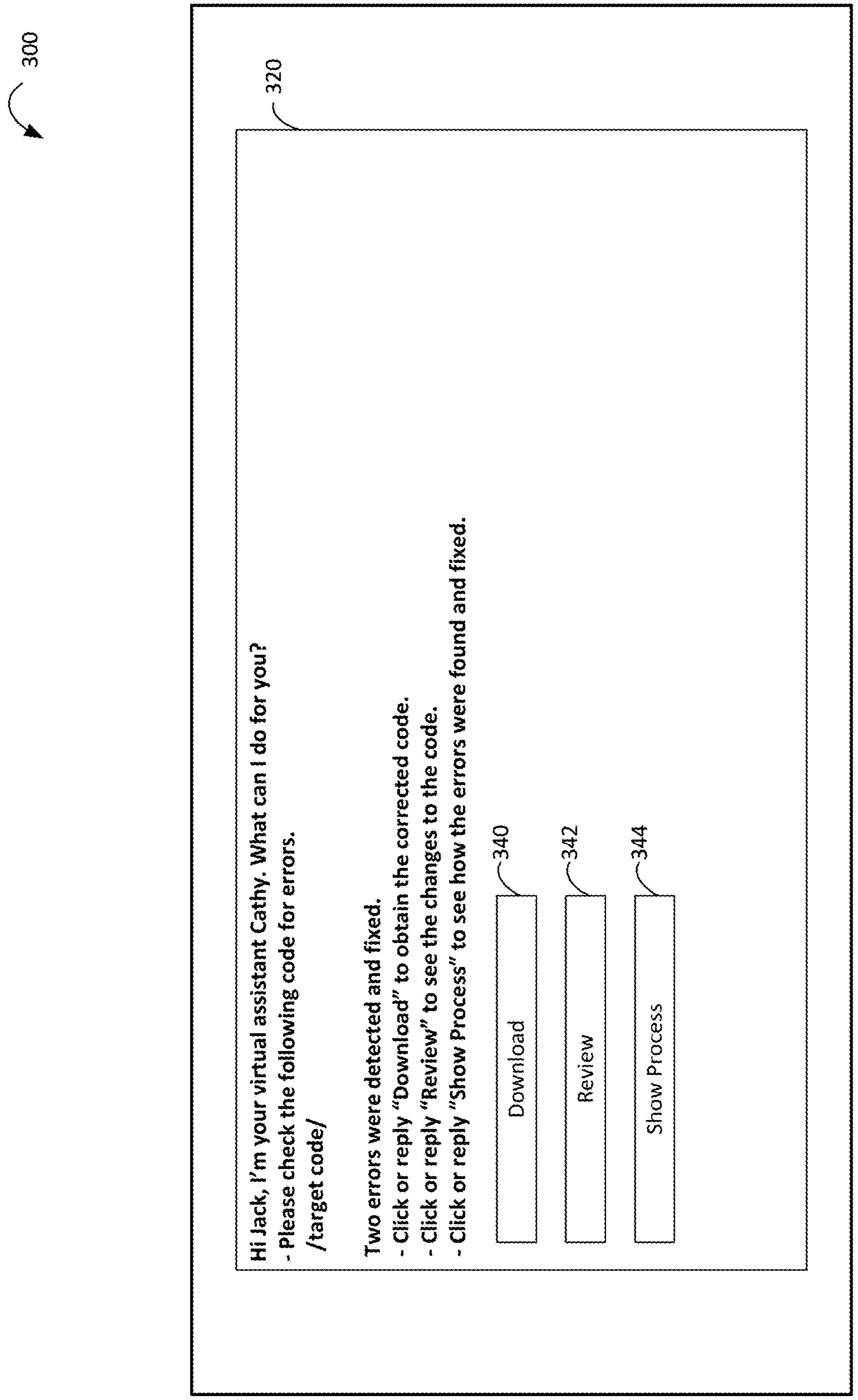
FIG. 3 depicts an exemplary graphical user interface (GUI) of an enterprise desktop application employing a chatbot.

FIG. 3 depicts an exemplary GUI 300 of an enterprise desktop application (app) employing an ML chatbot to check code for errors, according to one embodiment. The app may be run on a user device 102 communicating with a server 160 via a network 110.

A user may wish to check code for errors and fix the errors, if any. For example, the code to be checked may be code that implements an insurance application. In one aspect, an insurance carrier may provide a desktop app which a user may use to request code checking and error fixing via their user device 102. In the example of FIGS. 3, a user ("Jack") may use his desktop app to request code checking and error fixing.

The user may sign into the application via the user device 102 (e.g., a smartphone, tablet, laptop) using their user credentials, such as a username and password. The server 160 may initiate a communication session 320 within the app. The communication session 320 may include one or more of (i) audio (e.g., a telephone call), (ii) text messages (e.g., short messaging/SMS, multimedia messaging/MMS, iPhone iMessages, etc.), (iii) instant messages (e.g., real-time messaging such as a chat window), (iv) video such as video conferencing, (v) communication using virtual reality, (vi) communication using augmented reality, (vii) blockchain entries, (vii) communication in the metaverse, and/or any other suitable form of communication. The communication session 320 the server 160 initiates with the user's computer via the app includes instant messaging, interactive icons, and an interactive voice session where the user is able to speak his natural language responses into the computer.

The desktop app may request the user to provide information relevant to the code to be checked. For example, the desktop app may request the user to provide a package invoked by the code. The desktop app may request the user to provide additional code if the code provided by the user is incomplete. For example, the desktop app may request the user to provide test cases if test data, such as data regarding specific test cases to evaluate and/or test data to utilize in testing. The desktop app may allow the user to provide additional considerations, for example, whether the user is concerned about memory leakage, server pressure, security, confidentiality, and/or privacy.

After the code and/or relevant information are obtained by the server 160 via the app, the server 160 may generate a response comprising at least one of (1) the corrected code, (2) the changes to the code, and (3) the process of fixing the error. In one embodiment, the user may choose to (1) download the corrected code, (2) review the changes, and/or (3) see the process of fixing the error via selecting clickable icons 340, 342, and 344. In another embodiment, the user may do the same by responding in natural language. After the code is approved by the user, the server 160 may further integrate the corrected code into an insurance application.

Exemplary Methods of Checking Code for Errors

Figure 4:
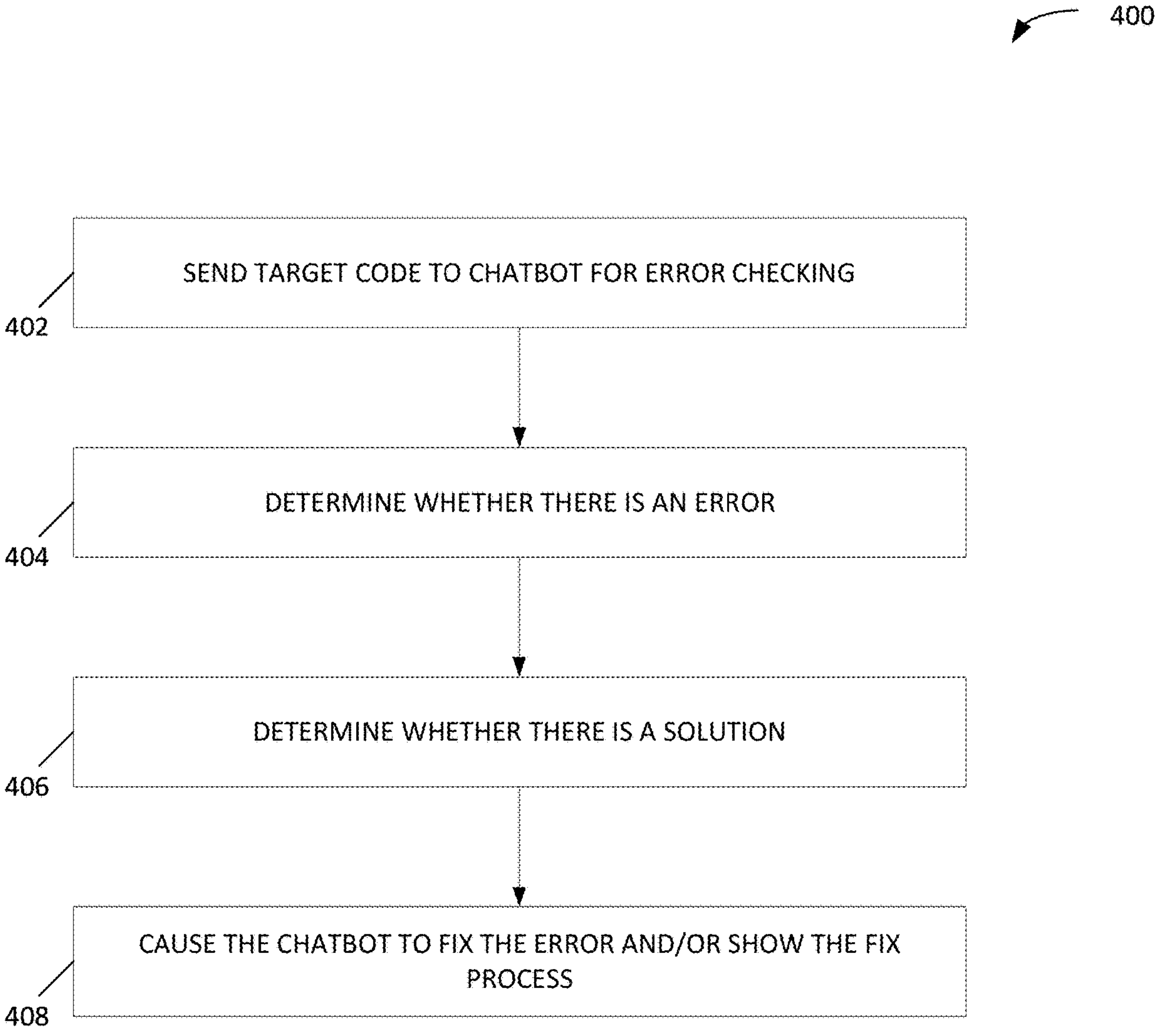
FIG. 4 depicts a flow diagram of an exemplary computer-implemented method for checking code for errors according to one embodiment.

FIG. 4 depicts a flow diagram of an exemplary computer-implemented method 400 of checking code for errors using a machine learning (ML) chatbot (or voice bot), according to one embodiment. One or more steps of the method 400 may be implemented as a set of instructions stored on a computer-readable memory and executable on one or more processors. The method 400 of FIG. 4 may be implemented via the exemplary computer environment 100 of FIG. 1.

The computer-implemented method 400 may include: (1) at block 402 sending, by one or more processors, target code to a chatbot for error checking; (2) at block 404 determine, by the one or more processors, whether there is an error in the target code based upon the response from the chatbot; (3) at block 406 responsive to determining there is an error, determining, by one or more processors, whether there is a solution to the error via an interaction with the chatbot; and/or (4) at block 408 responsive to determining there is a solution, causing, by the one or more processors, the chatbot to (i) fix the error and/or (ii) show a user the process to fix the error.

Figure 5A:
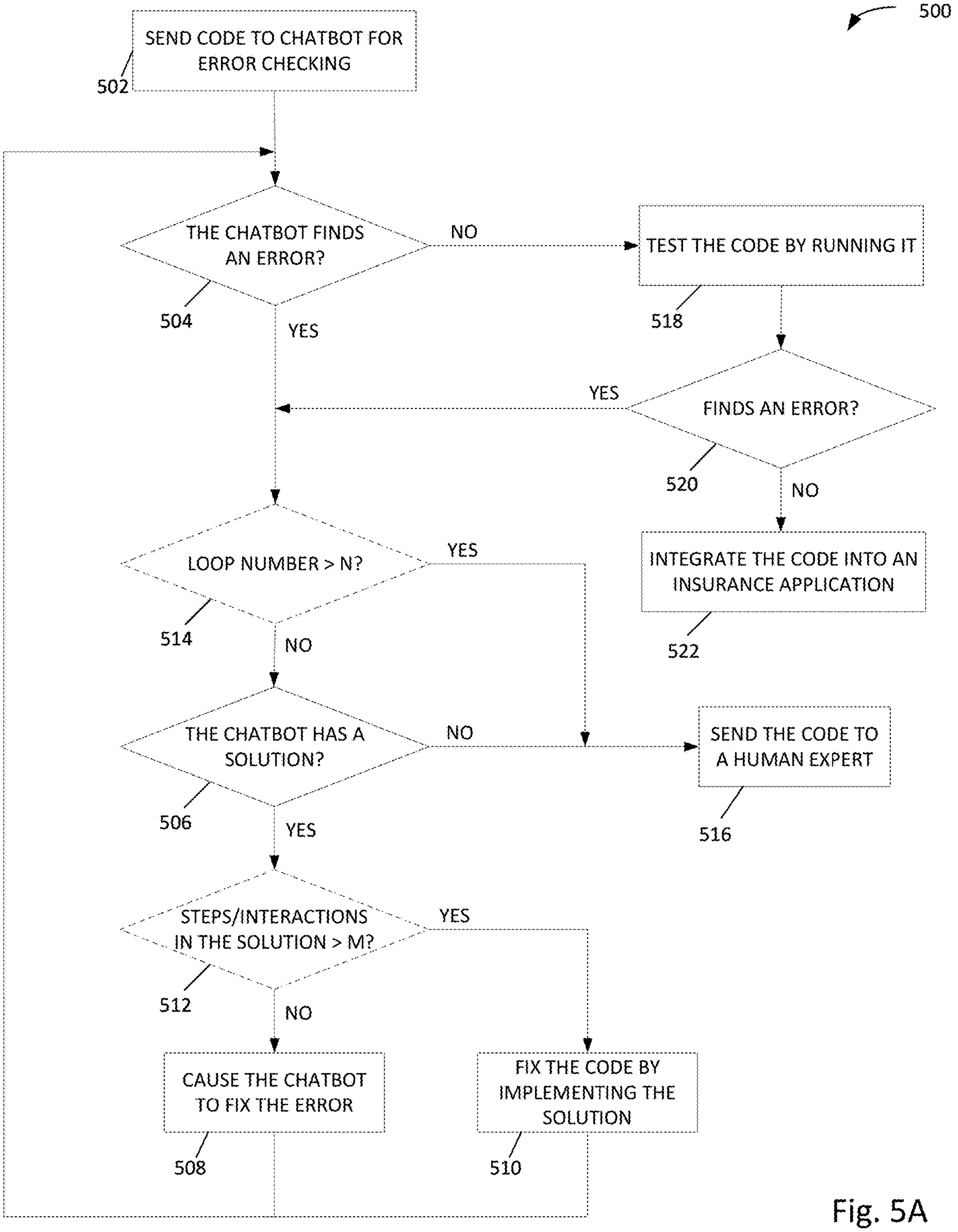
FIG. 5A depicts a flow diagram of an exemplary computer-implemented method for checking code for errors according to one embodiment.

FIG. 5A depicts a flow diagram of an exemplary computer-implemented method 500 of checking code for errors using a machine learning (ML) chatbot (or voice bot), according to one embodiment. One or more steps of the method 500 may be implemented as a set of instructions stored on a computer-readable memory and executable on one or more processors. The method 500 of FIG. 5A may be implemented via the exemplary computer environment 100 of FIG. 1.

In one embodiment, at block 502, a user may send, via user device 102, code to a chatbot 150 for error checking. The code may be used in an insurance application after the potential errors are fixed.

In another embodiment, at block 502, one or more processors 120 may send at least a portion of the code from the user as target code to the chatbot 150 for error checking. The one or more processors 120 may send the entire code from the user as target code to the chatbot 150 for error checking. Alternatively, the one or more processors 120 may send a portion of the code from the user as target code to the chatbot 150 at one time. For example, the one or more processors 120 may send a first module of the code to the chatbot 150 for error checking. After the first module is determined error-free, the one or more processors 120 may send a second module to the chatbot 150 for error checking, until all modules of the code from the user are determined error-free. The one or more processors 120 may then send the entire code to the chatbot 150 for a final error checking. Alternatively, the one or more processors 120 may send different modules to different chatbots for error checking in a parallel manner.

The one or more processors 120 may identify a code module by analyzing the comments in the code, the function names in the code, and/or documents associated with the code via the NLP model 148. Alternatively, the one or more processors 120 may determine a code module via the ML modules 140 by analyzing the code. For example, a portion of code that does not invoke another portion of the code may be identified as a standalone module to send to the chatbot 150 for error checking. A code module that requires another module may be sent together with the other module to the chatbot 150 for error checking the dependency tree for the module concurrently. Alternatively, the one or more processors 120 may disable the lines that require another module (e.g., by converting the lines into a comment format) and then send the code module to the chatbot for error checking in one turn. To this end, the ML modules 140 may be trained specifically for this purpose as described above.

At block 502, the one or more processors 120 may generate a prompt for error checking purposes. For example, the prompt may be as general as "Please check if there is an error in the following code" and include an indication of the target code. Alternatively, the prompt may cause the chatbot 150 to respond in a specific format. For example, the prompt may be "Please check if there is an error in the following code. If there is an error, please respond with 'yes.'"

At block 504, the one or more processors 120 may determine whether there is an error in the target code based upon the response from the chatbot 150. In one embodiment, the one or more processors 120 may make the determination by analyzing the response from the chatbot 150 via the NLP model 148. In another embodiment where the prompt for error checking causes the chatbot 150 to respond in a specific format, the one or more processors 120 may analyze the response from the chatbot 150 without the NLP model 148, for example, by patten matching (e.g., by regular expression operations). As one example, suppose the prompt for error checking is "Please check if there is an error in the following code. If there is an error, please respond with 'yes.'" The one or more processors 120 may determine if the response from chatbot 150 begins with a "yes"; and responsive to determining that the response begins with a "yes", determine that there is an error in the code.

In one embodiment, at block 504, the one or more processors 120 may cause the chatbot 150 to check the target code for errors via one or test cases. The test cases may be provided by the user. The test cases may be generated by the chatbot 150. Accordingly, the test cases may include data that is randomly generated using the chatbot 150. The test cases may be converted directly from data stored in the database 126 and/or data available on the Internet. The test cases may be generated by the one or more processors 120 via the ML modules 140 based upon data collected from one or more past or current users.

In one embodiment, responsive to the user having expressed concerns (e.g., during the communication session 320) about potential memory leakage with respect to the target code, at block 504, the one or more processors 120 may generate a prompt to cause the chatbot 150 to evaluate potential memory leakage for the target code. The one or more processors 120 may determine if there is a potential memory leakage issue based upon the response from the chatbot 150. Responsive to determining that the is such a risk, the one or more processors 120 may handle this issue in a similar manner with handling other errors, as described elsewhere herein.

Responsive to determining that there is an error in the code, at block 506, the one or more processors 120 may determine whether there is a solution for fixing the errors. The one or more processors 120 may make the determination via the NLP model 148. For example, the one or more processors may analyze the previous response from the chatbot 150 received at block 504 via the MLP model 148 and determine if there is information regarding solution in that response. Responsive to determining there is information regarding solution, the one or more processors 120 may further determine whether there is a solution via the NLP model 148. Responsive to determining there is no information regarding solution, the one or more processors 120 may generate a prompt to cause the chatbot 150 to determine whether there is a solution to the error. For example, the prompt may be "Please evaluate if there is a solution to the error identified in your response." The one or more processors 120 may then determine, via the NLP functionality 148, whether there is a solution to the error based a response from the chatbot 150. Alternatively, the prompt for evaluating solutions may cause the chatbot 150 to response in a specific format. In that case, the one or more processors 120 may analyze the response from the chatbot 150 by pattern matching.

Responsive to the one or more processors 120 determining that there is no error in the target code based upon the response from the chatbot 150 at block 504, the one or more processors 120 may test the target code via the code test functionality 145 at block 518. This step may prevent the output generated by the app includes a mistake or "hallucination" made by the chatbot 150.

In one embodiment, the one or more processors 120 may, via the code test functionality, implement the target code and determine, based upon the output generated by executing the code, whether there is an error. The determination may be adjusted based upon the language of the code. For example, if the code is written in C, C++, or Java, a "0" returned from a function means the code has been successfully executed. If the code is written in Python, a "None" returned from a function means the code has been successfully executed.

In one embodiment, the one or more processors 120 may make the determination by implementing the target code with test cases. Responsive to the output from executing the code being as intended, the one or more processors may determine that there is no error in the target code. The test cases may be generated in a similar manner as those used by the chatbot 150 as described above.

In one embodiment, responsive to the user having expressed concerns (e.g., during a communication session 320) about potential memory leakage with respect to the target code, at block 518, the one or more processors 120 monitor memory leakage while implementing the code. If memory leakage is detected, the one or more processors 120 may handle this issue in a similar manner with handling other errors, as described elsewhere herein.

At block 520, responsive to determining that there is no error in the target code based upon the implementation, at block 522, the one or more processors 120 may integrate the target code into an insurance application. Prior to the integration, the one or more processors 120 may send the target code to the user for review and/or approval. If the target code was found to contain errors but is error-free after the process from block 504 to block 508/510, the one or more processors 120 may integrate error-free code to an insurance application. For example, if the target code was part of the insurance application, the one or more processors 120 may replace the target code with the error-free code.

After the target code or the error-free code has been integrated into the insurance application to generate a new version of the insurance application, the one or more processors 120 may implement the new version of the insurance application for further testing. In one embodiment, responsive to the user having expressed concerns (e.g., during a communication session 320) about server pressure when implementing the code, the one or more processors 120 may implement the new version of insurance application with a substantial number of test cases within a short period of time for pressure testing. The rate of the test cases to test time may be 100,000 test cases per second, 1,000,000 test cases per second, or other suitable rates depending on the demand of the application.

Back to block 520, responsive to determining that there is an error in the code, the one or more processors 120 may send the error to the chatbot 150 to evaluate for solutions at block 506. The error sent to the chatbot 150 may include the code line(s) whether the error occurs, the type of the error, and/or a return code for the error (e.g., "line 18, error: 'x' was not declared in the scope; exit with code −1").

In one embodiment, at block 508, responsive to determining that the chatbot 150 finds a solution to the error, the one or more processors 120 may cause the chatbot 150 to fix the error. For example, the one or more processors 120 may send a prompt to cause the chatbot 150 to respond with a new version of the target code in which the error has been fixed (e.g., "Please provide the code with the error fixed.").

In another embodiment, at block 510, responsive to determining that the chatbot 150 finds a solution to the error, the one or more processors 120 fix the error by implementing the solution with respect to the target code. The one or more processors 120 may also display the process to fix the error to a user to inform the user of the process.

Figure 5B:
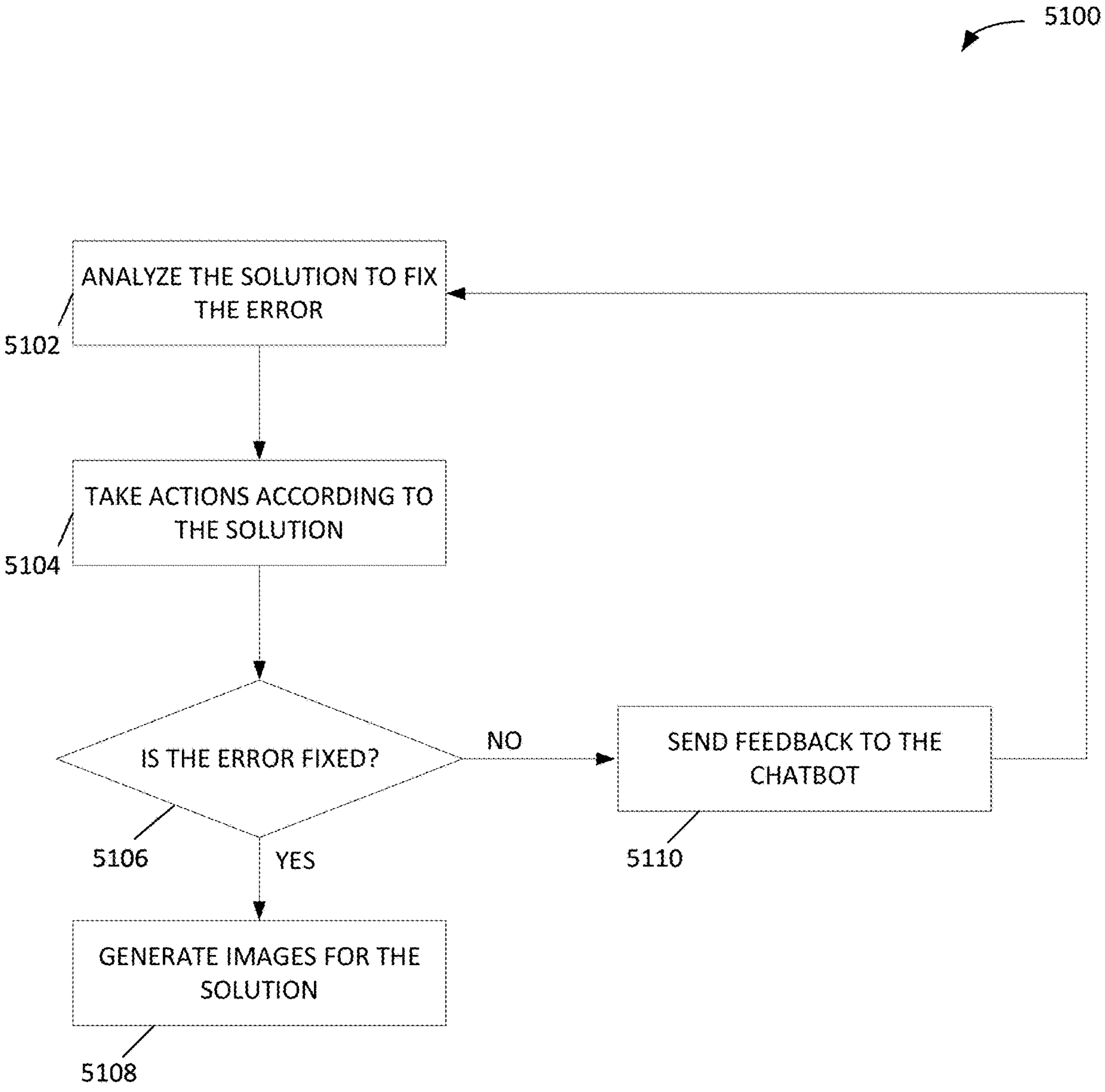
FIG. 5B depicts a flow diagram of an exemplary computer-implemented method for implementing block 510 of FIG. 5A according to one embodiment.

FIG. 5B depicts a flow diagram of an exemplary computer-implemented method 5100 for implementing block 510 of FIG. 5A according to one embodiment. One or more steps of the method 5100 may be implemented as a set of instructions stored on a computer-readable memory and executable on one or more processors. The method 5100 of FIG. 5B may be implemented via the exemplary computer environment 100 of FIG. 1.

At block 5102, upon receiving a solution to fix the error from the chatbot 150, the one or more processors 120 may analyze the solution via the NLP model 140 in the response and generate executable instructions accordingly. For example, the process in the response from chatbot 150 may be, for example:

1) Add a break point at line X then execute the code;
2) The values of variables x, y, and z should be 'x', 'y', and 'z;'
3) If true, remove the break point at line X and add a break point at line Y;
4) Else, change line X to 'new_code_line'

The one or more processors 120, via the NLP model 140 or the chatbot 150, may "understand" this process and generate executable instructions compliant to be implemented by the code test module 145.

In some instances, one or more processors 120 may generate executable instructions implementing all steps of the process at one time. This approach is advantageous when no interactions (e.g., trial and errors) are required by the solution.

In other instances, the one or more processors 120 may generate executable instructions implementing one step of the process at a time, and generate executable instructions implementing a further step based upon the process in the response and the output from the code test functionality 145. To this end, the one or more processors 120 may generate a prompt via the NLP model 140 based upon a first step of the solution. The one or more processors 120 may send the prompt to the chatbot 150 to generate one or more executable instructions for implementing the first step with respect to the target code. The one or more processors 120 may implement the one or more executable instructions to implement the first step of the solution (e.g., add a break point at line X to the target code in the example above). By implementing the one or more executable instructions, the one or more processors 120 may obtain an updated version of the target code. An updated version of the target code may be the target code in an updated state (e.g., a break point is added to the target code) or with an updated content (e.g., a line of the target code is changed).

In some scenarios, the solution may include a second step. The second step may include a plurality of action options (e.g., steps 2-4 in the example above). The one or more processors 120 may implement the updated version of code to obtain an implementation result. The one or more processors 120 may select an action option from the plurality of action options based upon the implementation result. For example, if the implementation result shows that the values of variables x, y, and z are not 'x', 'y', and 'z' in the example above, the one or more processors 120 may perform the fourth step in the example above. The one or more processors 120 may generate a prompt based upon the selected action option. The one or more processors 120 may then send the prompt to the chatbot 150 to generate executable instructions for performing the selected action option and perform the selected action option by implementing the executable instructions in a similar manner described herein above. Although described as a "second step", it should be understood that the "second step" here may be any number of steps performed after a first step of the solution.

In some scenarios, the one or more processors 120 may determine whether an implementation result from implementing a particular step is consistent with the solution. For example, if the implementation result of the first step in the example above shows that the code contains an error before line X and consequently the variables x, y, and z are not assigned with any value, the one or more processors 120 may determine that the implementation result is inconsistent with the solution. The one or more processors 120 may send the implementation result to the chatbot 150 to receive an updated solution.

At block 5104, the one or more processors 120 may implement the executable instructions generated above via the code test module 145.

At block 5106, the one or more processors 120 may determine whether the error has been fixed based upon the output from the code test module 145. For example, responsive to the code having been executed without any error and/or the output from executing the case with a test case is as intended, the one or more processors 120 may determine the error has been fixed.

At block 5108, responsive to determining that the error has been fixed, the one or more processors 120 may generate images to show the process of fixing the error. For example, the one or more processors may implement the process and take screenshots of the steps at the same time. Alternatively, the one or more processors may generate images based upon the implementation via the ML modules 140. To this end, the ML modules 140 may have been trained specifically for this purpose as described elsewhere herein.

At block 5110, responsive to determining that the error has not been fixed, the one or more processors 120 may send the output from the code test module 145 as feedback to the chatbot 150. Along with output, the one or more processors 120 may add a prompt to provide a context for the output.

For example, the prompt may be "I tried your advice, but the error has not been fixed. Here is the output generated by implementing your advice. Please provide a solution to this problem."

Responsive to receiving a response from the chatbot 150, the one or more processors 120 may analyze the response as described above at block 5102.

The one or more processors 120 may generate videos for fixing errors based upon the response from the chatbot 150. In one embodiment, the ML modules 140 may generate videos for fixing errors. To this end, the ML modules 140 may have been trained with videos for fixing code errors. Alternatively, the one or more processors 120 may implement a process for fixing code errors as described above, and generate a video for the process by recording the screen. Alternatively, the one or more processors 120 may generate images for fixing code errors as described above. The one or more processors 120 may then generate videos based upon the images via the ML modules 140. To this end, the ML modules 140 may have been trained specifically for this purpose as described elsewhere herein.

The one or more processors 120 may generate audios for fixing errors based upon the response from the chatbot 150. In one embodiment, the one or more processors 120 may convert the response from the chatbot 150 to an audio format. The one or more processors 120 may make the conversion via the NLP model 148 or the ML modules 140 such that the audio sounds more natural to a human. To this end, the NLP model 148 or the ML modules 140 may have been trained with audio files and scripts associated with the audio files.

The one or more processors 120 may generate videos with audios for fixing errors based upon the response from the chatbot 150. In one embodiment, the ML modules 140 may generate videos with audios for fixing errors. To this end, the ML modules 140 may have been trained with videos with audios for fixing code errors.

In another embodiment, the one or more processors 120 may add audio to the videos generated by the one or more processors 120 described above. In the scenario where the video is generated by recording the screen, the one or more processors 120 may add metadata to the video while recording the screen. For example, at the start point the one or more processors 120 is implementing an executable instruction, the one or more processors 120 may add a metadata such as "at 00:00, $1^{st}$ instruction." The one or more processors 120 may then add an audio file corresponding to the instruction being implemented at the time point as described above. For example, if at 00:00, a first instruction is being implemented, the one or more processors may generate an audio file by converting the text in the response from the chatbot 150 that corresponds to the first instruction, and then add the audio file to time point 00:00 according to the metadata. Alternatively, the one or more processors 120 may store the information of the relationship between the time points and the executable instructions in memory 122 or database 126. Based upon the relationship between the time points and executable instructions, the one or more processors 120 may generate audio files and add the audio files to appropriate time points of the video in a similar manner described above.

In the scenario where the video is generated via the ML modules 140 based upon the images generated above, the one or more processors 120 may associate the images with the executable instructions that images show. For example, if a first image shows the implementation of a first instruction, the one or more processors 120 may add "first instruction" to the first image as part of the metadata of the image. Alternatively, the one or more processors 120 may store the information of the relationship between the images and the executable instructions in memory 122 or database 126. When generating the videos based upon the images, the one or more processors 120 may associate a particular portion of the video with a particular image. Based upon the relationship between the video and the images, and the relationship between the images and executable instructions, the one or more processors 120 may generate audio files and add the audio files to appropriate time points of the video in a similar manner described above.

It should be understood that the steps regarding presenting the process to fix the error may also be implemented with block 508.

Referring back to FIG. 5A, at block 506, the one or more processors 120 may cause the chatbot 150 to provide a solution to the error. Upon receiving the response from the chatbot, at block 512, the one or more processors 120 may determine if the solution involves multiple steps or multiple interactions, e.g., whether the number of steps and/or interactions required by the solution exceeds a certain number M, where M may be any appropriate integer. Responsive to determining that the solution does not involve multiple steps or multiple interactions, the one or more processors 120 processors 120 may proceed with block 508 cause the chatbot 150 to fix the error directly. Otherwise, the one or more processors 120 may proceed with block 510. For example, an error that a variable is used without a declaration may be fixed by adding a declaration line before the line that first uses the variable. Such a simple fix may be implemented by the chatbot 150 directly. As another example, there are scenarios where the origin of the error is unclear. The fix process may involve adding break points at appropriate lines, check if the output is as intended and then decide how to proceed next. Such a multi-step fix process may require multiple trials before the error origin is found. In that case, block 510 is the better choice. The one or more processors 120 may determine which option to move forward with via the NLP model 148. The NLP model 148 may allow the one or more processors 120 to "understand" the steps required to implement the fix process in the response from the chatbot 150. Based upon the steps, the one or more processors 120 may analyze if the steps and/or interactions required in process exceed a predetermined threshold.

The process described above may be implemented more than once. For example, after the target code has been corrected at block 508 or block 510, the one or more processors 120 may send the corrected code the chatbot 150 for further error checking at block 504. At block 514, the one or more processors 120 may determine the whether the number of implementing blocks 504 through 508/510 exceeds a predetermined threshold, e.g., a certain number N, where N may be any appropriate integer. Responsive to determining the number of implementation does not exceeding the predetermined threshold, the one or more processors 120 may proceed with implementing block 506. Responsive to determining the number of implementation exceeds the predetermined threshold, the one or more processors 120 may send the code and the error to a human expert.

It should be understood that not all blocks of the exemplary flow diagrams 500 and 5100 are required to be performed. Moreover, the exemplary flowcharts 500 and 5100 are not mutually exclusive (e.g., block(s) from exemplary flow diagram 500 or 5100 may be performed in any particular implementation).

Additional Considerations

As used herein, the term "user" may refer to anyone uses the application according to the embodiments disclosed herein.

As used herein, an "error" may refer to one or more errors. An "error" may refer to an error that causes code to be implemented unsuccessfully. An "error" may also refer to a warning that does not cause the code to fail, but may not be in the best practice of coding and/or may cause problems in other scenarios or downstream.

Unless otherwise indicated, the processes implemented by an ML chatbot may be implemented by an ML voice bot, an AI chatbot, an AI voice bot, and/or a large language model (LLM).

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionalities presented as separate components in exemplary configurations may be implemented as a combined structure or component. Similarly, structures and functionalities presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware functionalities of a computer system (e.g., a processor or a group of processors) may be configured by software (e.g., an application or application portion) as a hardware functionality that operates to perform certain operations as described herein.

In various embodiments, a hardware functionality may be implemented mechanically or electronically. For example, a hardware functionality may comprise dedicated circuitry or logic that is permanently configured (e.g., as a special-purpose processor, such as a field programmable gate array (FPGA) or an application-specific integrated circuit (ASIC) to perform certain operations). A hardware functionality may also comprise programmable logic or circuitry (e.g., as encompassed within a general-purpose processor or other programmable processor) that is temporarily configured by software to perform certain operations. It will be appreciated that the decision to implement a hardware functionality mechanically, in dedicated and permanently configured circuitry, or in temporarily configured circuitry (e.g., configured by software) may be driven by cost and time considerations.

Accordingly, the term "hardware functionality" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware functionalities are temporarily configured (e.g., programmed), each of the hardware functionalities need not be configured or instantiated at any one instance in time. For example, where the hardware functionalities comprise a general-purpose processor configured using software, the general-purpose processor may be configured as respective different hardware functionalities at different times. Software may accordingly configure a processor, for example, to constitute a particular hardware functionality at one instance of time and to constitute a different hardware functionality at a different instance of time.

Hardware functionalities can provide information to, and receive information from, other hardware functionalities. Accordingly, the described hardware functionalities may be regarded as being communicatively coupled. Where multiple of such hardware functionalities exist contemporaneously, communications may be achieved through signal transmission (e.g., over appropriate circuits and buses) that connect the hardware functionalities. In embodiments in which multiple hardware functionalities are configured or instantiated at different times, communications between such hardware functionalities may be achieved, for example, through the storage and retrieval of information in memory structures to which the multiple hardware functionalities have access. For example, one hardware functionality may perform an operation and store the output of that operation in a memory device to which it is communicatively coupled. A further hardware functionality may then, at a later time, access the memory device to retrieve and process the stored output. Hardware functionalities may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented functionalities that operate to perform one or more operations or functions. The functionalities referred to herein may, in some exemplary embodiments, comprise processor-implemented functionalities.

Similarly, the methods or routines described herein may be at least partially processor-implemented. For example, at least some of the operations of a method may be performed by one or more processors or processor-implemented hardware functionalities. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing." "computing," "calculating." "determining." "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising." "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

The systems and methods described herein are directed to an improvement to computer functionality, and improve the functioning of conventional computer systems.

What is claimed:

1. A computer system for using a machine learning (ML) chatbot to check errors associated with a target code, the computer system comprising:
- one or more processors; and
- a memory storing executable instructions thereon that, when executed by the one or more processors, cause the one or more processors to:
  - receive, from a user device, an indication of the target code, wherein the target code includes a plurality of modules;
  - for each module of the plurality of modules, send a first prompt for code checking to a respective ML chatbot of a plurality of ML chatbots to cause the respective ML chatbot to check the module for errors;
  - for each module determined to be having an error:
    - extract, from a response from the respective ML chatbot, a module-specific solution for fixing the error;
    - send a second prompt to the respective ML chatbot to update the module based upon the error and the module-specific solution to the error;
    - determine whether the updated module fixes the error by:
      - (i) executing the updated module in connection with a test case in a test environment to generate an implementation result, wherein the test case checks for the error and is associated with an expected result defined by the test case, and
      - (ii) determining whether the implementation result complies with the expected result; and
    - responsive to determining that the implementation result does not comply with the expected result, send a third prompt to the respective ML chatbot to further update the updated module based upon the implementation result, and repeating steps (i) and (ii) with the further updated module;

responsive to determining that, for the each module determined to be having an error, a respective implementation result complies with a respective expected result, generate an overall solution to the error based upon one or more updated modules; and transmit, to the user device, an indication of the overall solution for implementation by a user of the user device.

2. The computer system of claim 1, wherein to cause the respective ML chatbot to check the module for errors, the executable instructions, when executed by the one or more processors, cause the one or more processors to:

send the first prompt to cause the respective ML chatbot to check the module with the test case for errors.

3. The computer system of claim 1, wherein to update the module, the executable instructions, when executed by the one or more processors, cause the one or more processors to:

generate the second prompt based upon the module-specific solution;

send the second prompt to the ML chatbot to generate executable instructions associated with the module-specific solution; and execute the executable instructions associated with the module-specific solution to update the module.

4. The computer system of claim 1, wherein the module-specific solution includes a first step and a second step, the second step comprising a plurality of action options, and wherein to update the module, the executable instructions, when executed by the one or more processors, further cause the one or more processors to:

send the second prompt to the ML chatbot to generate an intermediate updated version of the module based upon the first step;

implement the intermediate updated version of the module in the test environment to obtain an intermediate implementation result;

select an action option from the plurality of action options based upon the intermediate implementation result; and send a fourth prompt to generate the updated version of the module based upon the selected action option.

5. The computer system of claim 1, wherein the executable instructions, when executed by the one or more processors, further cause the one or more processors to:

generate at least one of an image, an audio, or a video associated with the overall solution; and present the at least one of the image, the audio, or the video to a user.

6. A computer-implemented method for using a machine learning (ML) chatbot to check errors associated with a target code, the method comprising:

receiving, by one or more processors from a user device, an indication of the target code, wherein the target code includes a plurality of modules;

for each module of the plurality of modules, sending, by the one or more processors, a first prompt for code checking to a respective ML chatbot of a plurality of ML chatbots to cause the respective ML chatbot to check the module for errors;

for each module determined to be having an error;

extracting, by the one or more processors and from a response from the respective ML chatbot, a module-specific solution for fixing the error;

sending, by the one or more processors, a second prompt to the respective ML chatbot to update the module based upon the error and the module-specific solution to the error;

determining, by the one or more processors, whether the updated module fixes the error by:

(i) executing the updated module in connection with a test case in a test environment to generate an implementation result, wherein the test case checks for the error and is associated with an expected result defined by the test case, and (ii) determining whether the implementation result complies with the expected result; and responsive to determining that the implementation result does not comply with the expected result, sending, by the one or more processors, a third prompt to the respective ML chatbot to further update the updated module based upon the implementation result, and repeating steps (i) and (ii) with the further updated module;

responsive to determining that, for the each module determined to be having an error, a respective implementation result complies with a respective expected result, generating an overall solution to the error based upon one or more updated modules; and transmitting, by the one or more processors and to the user device, an indication of the overall solution for implementation by a user of the user device.

7. The computer-implemented method of claim 6, wherein causing the respective ML chatbot to check the module for errors includes:

sending, by the one or more processors, the first prompt to cause the respective ML chatbot to check the module with the test case for errors.

8. The computer-implemented method of claim 6, wherein updating the module includes:

generating, by the one or more processors, the second prompt based upon the module-specific solution;

sending, by the one or more processors, the second prompt to the ML chatbot to generate executable instructions associated with the module-specific solution; and executing, by the one or more processors, the executable instructions associated with the module-specific solution to update the module.

9. The computer-implemented method of claim 6, wherein the module-specific solution includes a first step and a second step, the second step comprising a plurality of action options, and wherein updating the module includes:

sending, by the one or more processors, the second prompt to the ML chatbot to generate an intermediate updated version of the module;

implementing, by the one or more processors, the intermediate updated version of the module in the test environment to obtain an intermediate implementation result;

selecting, by the one or more processors, an action option from the plurality of action options based upon the intermediate implementation result; and sending a fourth prompt, by the one or more processors, to generate the updated version of the module based upon the selected action option.

10. The computer-implemented method of claim 6, further comprising:

generating, by the one or more processors, at least one of an image, an audio, or a video associated with the overall solution; and presenting, by the one or more processors, the at least one of the image, the audio, or the video to a user.

11. A non-transitory computer-readable storage medium comprising computer-readable instructions stored thereon for using a machine learning (ML) chatbot to check errors associated with a target code, wherein the computer-readable instructions when executed on one or more processors cause the one or more processors to:

receive, from a user device, an indication of the target code, wherein the target code includes a plurality of modules;

for each module of the plurality of modules, send a first prompt for code checking to a respective ML chatbot of a plurality of ML chatbots to cause the respective ML chatbot to check the module for errors;

for each module determined to be having an error:

extract, from a response from the respective ML chatbot, a module-specific solution for fixing the error;

send a second prompt to the respective ML chatbot to update the module based upon the error and the module-specific solution to the error;

determine whether the updated module fixes the error by:

(i) executing the updated module in connection with a test case in a test environment to generate an implementation result, wherein the test case checks for the error and is associated with an expected result defined by the test case, and (ii) determining whether the implementation result complies with the expected result; and responsive to determining that the implementation result does not comply with the expected result, send a third prompt to the respective ML chatbot to further update the updated module based upon the implementation result, and repeating steps (i) and (ii) with the further updated module;

responsive to determining that, for the each module determined to be having an error, a respective implementation result complies with a respective expected result, generate an overall solution to the error based upon one or more updated modules; and transmit, to the user device, an indication of the overall solution for implementation by a user of the user device.

12. The non-transitory computer-readable storage medium of claim 11, wherein to cause the respective ML chatbot to check the module for errors, the computer-readable instructions, when executed by the one or more processors, further cause the one or more processors to:

send the first prompt to cause the respective ML chatbot to check the module with the test case to check for errors.

13. The non-transitory computer-readable storage medium of claim 11, wherein to update the module, the computer-readable instructions, when executed by the one or more processors, cause the one or more processors to:

generate the second prompt based upon the module-specific solution;

send the second prompt to the ML chatbot to generate executable instructions associated with the module-specific solution; and execute the executable instructions associated with the module-specific solution to update the module.

14. The non-transitory computer-readable storage medium of claim 11, wherein the module-specific solution includes a first step and a second step, the second step comprising a plurality of action options, and wherein to update the module, the computer-readable instructions, when executed by the one or more processors, cause the one or more processors to:

send the second prompt to the ML chatbot to generate an intermediate updated version of the module based upon the first step;

implement the intermediate updated version of the module in the test environment to obtain an intermediate implementation result;

select an action option from the plurality of action options based upon the intermediate implementation result; and send a fourth prompt to generate the updated version of the module based upon the selected action option.

15. The non-transitory computer-readable storage medium of claim 11, wherein the computer-readable instructions, when executed by the one or more processors, further cause the one or more processors to:

generate at least one of an image, an audio, or a video associated with the overall solution; and present the at least one of the image, the audio, or the video to a user.

* * * * *